United States Patent
Zanger et al.

(10) Patent No.: US 8,407,280 B2
(45) Date of Patent: Mar. 26, 2013

(54) ASYNCHRONOUS MULTI-SOURCE STREAMING

(75) Inventors: Yoel Moshe Zanger, Tel-Aviv (IL); Gil Matan Gat, Tel-Aviv (IL); Dvir Volk, Tel-Aviv (IL); Stanislav Tulchin, Tel-Aviv (IL)

(73) Assignee: Giraffic Technologies Ltd., Tel Aviv (IL)

( * ) Notice: Subject to any disclaimer, the term of this patent is extended or adjusted under 35 U.S.C. 154(b) by 64 days.

(21) Appl. No.: 13/209,417

(22) Filed: Aug. 14, 2011

(65) Prior Publication Data

US 2012/0054260 A1   Mar. 1, 2012

(30) Foreign Application Priority Data

Aug. 26, 2010   (GB) .................................. 1014233.9

(51) Int. Cl.
G06F 15/16   (2006.01)
G06F 15/173   (2006.01)
(52) U.S. Cl. .................. 709/202; 709/224; 709/231
(58) Field of Classification Search .................. 709/202, 709/224, 231
See application file for complete search history.

(56) References Cited

U.S. PATENT DOCUMENTS

| | | | |
|---|---|---|---|
| 6,970,937 B1 * | 11/2005 | Huntington .................... | 709/231 |
| 7,174,385 B2 * | 2/2007 | Li ................................. | 709/231 |
| 8,150,966 B2 * | 4/2012 | Gyo et al. ..................... | 709/224 |
| 8,315,502 B2 * | 11/2012 | Martch et al. ................. | 386/216 |
| 2002/0049760 A1 * | 4/2002 | Scott et al. ..................... | 707/10 |
| 2002/0161898 A1 * | 10/2002 | Hartop et al. ................. | 709/227 |
| 2004/0143672 A1 * | 7/2004 | Padmanabham et al. ..... | 709/231 |
| 2006/0190615 A1 | 8/2006 | Panwar et al. | |

FOREIGN PATENT DOCUMENTS

| | | |
|---|---|---|
| WO | 2008010802 A1 | 1/2008 |
| WO | 2009018428 A3 | 2/2009 |

OTHER PUBLICATIONS

"Scalable multimedia streaming model in heterogeneous networks", Itaya S. et al., International Journal of High Performance Computing and Networking 2007.
UK Combined Search and Examination Report issued on Dec. 16, 2010 for parent application No. GB1014233.9.

* cited by examiner

Primary Examiner — Wing F Chan
Assistant Examiner — David X Yi
(74) Attorney, Agent, or Firm — Manelli Selter PLLC; Edward J. Stemberger

(57) ABSTRACT

A method of data streaming over a Peer-to-Peer network including server agents and client agents is provided. The method includes: assigning, responsive of a client agent request for a specified file, a sub streams set, being a set of server agents configured each to partition the specified file into frames whose size is configured based on the specified file, wherein the sub streams set comprises a plurality of active server agents and further includes a plurality of redundant active server agents selected based on network properties, such that a minimal number of excessive packets are sent to the client agent; managing the sub streams set asynchronously such that each server agent streams frames independently on other server agents in the sub streams set; and employing a rate-based congestion control per sub streams set such that a bit rate associated with the sub streams set is maintained above a specified threshold.

15 Claims, 2 Drawing Sheets

*200*

210 — PROVIDING A PEER-TO-PEER NETWORK INCLUDING AGENTS, EACH ONE OF THE AGENTS BEING CONFIGURABLE AS AT LEAST ONE OF: A CLIENT AGENT CONFIGURED TO RECEIVE DATA AND A SERVER AGENT CONFIGURED TO STREAM DATA

220 — ASSIGNING, RESPONSIVE OF A CLIENT AGENT REQUEST FOR A SPECIFIED FILE, A SUB STREAMS SET, BEING A SET OF SERVER AGENTS CONFIGURED EACH TO PARTITION THE SPECIFIED FILE INTO FRAMES WHOSE SIZE IS CONFIGURED BASED ON THE SPECIFIED FILE, WHEREIN THE SUB STREAMS SET COMPRISES A PLURALITY OF ACTIVE SERVER AGENTS AND FURTHER INCLUDES A PLURALITY OF REDUNDANT ACTIVE SERVER AGENTS SELECTED BASED ON NETWORK PROPERTIES, SUCH THAT A MINIMAL NUMBER OF EXCESSIVE PACKETS ARE SENT TO THE CLIENT AGENT

230 — MANAGING THE SUB STREAMS SET ASYNCHRONOUSLY SUCH THAT EACH SERVER AGENT STREAMS FRAMES INDEPENDENTLY ON OTHER SERVER AGENTS IN THE SUB STREAMS SET

240 — EMPLOYING A RATE-BASED CONGESTION CONTROL PER SUB STREAMS SET SUCH THAT A BIT RATE ASSOCIATED WITH THE SUB STREAMS SET IS MAINTAINED ABOVE A SPECIFIED THRESHOLD

Figure 2

ASYNCHRONOUS MULTI-SOURCE STREAMING

BACKGROUND

1. Technical Field

The present invention relates to the field of Peer-to-Peer computer networks, and more particularly, to streaming data files in such networks.

2. Discussion of Related Art

File sharing is becoming ever more common, and as the computer networks grow larger, so does the need to stream data in an efficient way that utilizes the maximal capabilities of the sharing agents. Maintaining quality of service in a Peer-to-Peer network poses a challenge that derives, among other things, from the distributed nature of the network, as well as the uncertainty of the availability of the sharing agents over time.

A widely used Peer-to-Peer protocol is the BitTorrent protocol. This protocol allows users to distribute large amounts of data without the heavy demands on their computers that would be needed for standard Internet hosting. A standard host's servers can easily be brought to a halt if high levels of simultaneous data flow are reached.

In operation, a user playing the role of file-provider makes a file available to the network. This first user's file is called a seed and its availability on the network allows other users, called peers, to connect and begin to download the seed file. As new peers connect to the network and request the same file, their computer receives a different piece of the data from the seed. Once multiple peers have multiple pieces of the seed, BitTorrent allows each to become a source for that portion of the file. The effect of this is to take on a small part of the task and relieve the initial user, distributing the file download task among the seed and many peers. With BitTorrent, no one computer needs to supply data in quantities which could jeopardize the task by overwhelming all resources, yet the same final result (each peer eventually receiving the entire file) is still reached.

After the file is successfully and completely downloaded by a given peer, the peer is able to shift roles and become an additional seed, helping the remaining peers to receive the entire file. This eventual shift from peers to seeders determines the overall 'health' of the file (as determined by the number of times a file is available in its complete form).

BRIEF SUMMARY

One aspect of the invention provides a system for data streaming over a Peer-to-Peer network. The system includes: a Peer-to-Peer network that includes agents, each one of the agents being configurable as at least one of: a client agent configured to receive data and a server agent configured to stream data. The system further includes a streaming manager configured to: (i) assign, responsive of a client agent request for a specified file, a sub streams set, being a set of server agents configured each to partition the specified file into frames whose size is configured based on the specified file, wherein the sub streams set comprises a plurality of active server agents and further includes a plurality of redundant active server agents selected based on network properties, such that a minimal number of excessive packets are sent to the client agent; and (ii) manage the sub streams set asynchronously such that each server agent streams frames independently on other server agents in the sub streams set. The system further includes a congestion reduction unit configured to employ a rate-based congestion control per sub streams set such that a bit rate associated with the sub streams set is maintained above a specified threshold.

Other aspects of the invention may include a method arranged to execute the aforementioned system independently of the aforementioned architecture and a computer readable program configured to execute the aforementioned system. These, additional, and/or other aspects and/or advantages of the embodiments of the present invention are set forth in the detailed description which follows; possibly inferable from the detailed description; and/or learnable by practice of the embodiments of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIG. 2 is a high level flowchart diagram illustrating a method according to some embodiments of the invention.

Figure 1:
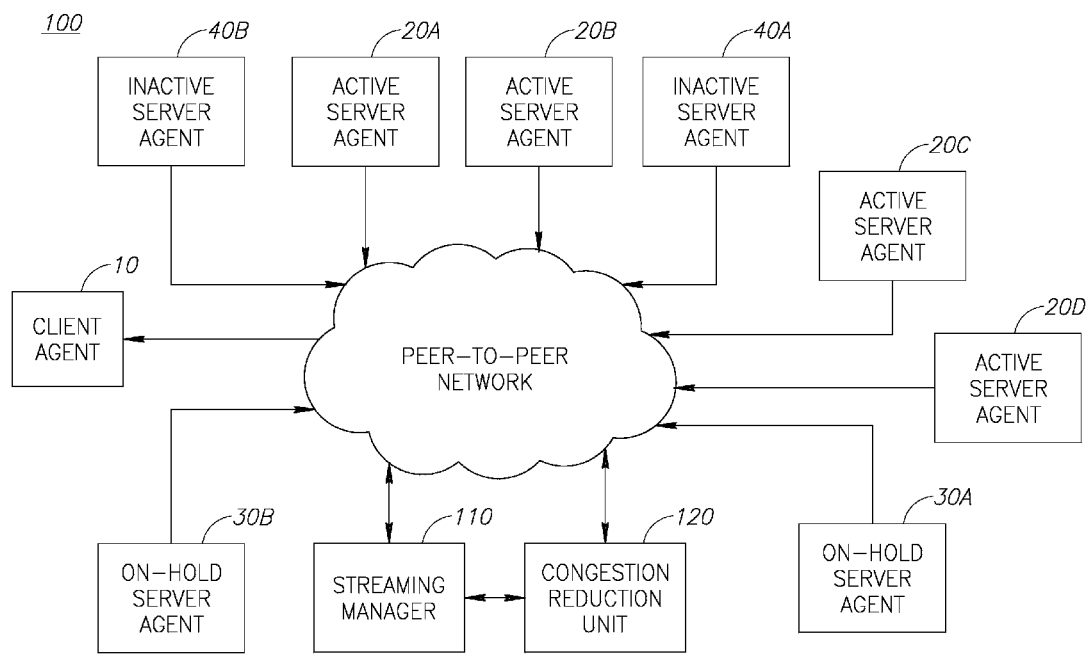
FIG. 1 is a high level schematic diagram illustrating an environment of a system according to some embodiments of the invention.

The drawings together with the following detailed description make apparent to those skilled in the art how the invention may be embodied in practice.

DETAILED DESCRIPTION

Prior to setting forth the detailed description, it may be helpful to set forth definitions of certain terms that will be used hereinafter.

The term "agent" as used herein in this application refers to a software abstraction, an idea, or a concept, similar to object oriented programming terms such as methods, functions, and objects. The concept of an agent provides a convenient and powerful way to describe a complex software entity that is capable of acting with a certain degree of autonomy in order to accomplish tasks on behalf of its user. But unlike objects, which are defined in terms of methods and attributes, an agent is defined in terms of its behavior.

The term "Peer-to-Peer" commonly abbreviated to "P2P" as used herein in this application refers to a any distributed network architecture composed of participants that make a portion of their resources (such as processing power, disk storage or network bandwidth) directly available to other network participants, without the need for central coordination instances (such as servers or stable hosts). Peers are both suppliers and consumers of resources, in contrast to the traditional client-server model where only servers supply, and clients consume.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 shows, a system 100 according to some embodiments of the invention. System 100 is embedded within a Peer-to-Peer network, that includes agents (e.g., 10, 20, 30, 40) each one of the agents may be capable of being either a client 10 or a server (20, 30, 40). A client agent 10 is configured to receive data while a server agent (20, 30, and 40) is configured to stream data over the Peer-to-Peer network. In addition, system 100 further includes a streaming manager 110 and a congestion reduction unit 120 connected to the Peer-to-Peer network and capable of controlling each one of the agents (e.g., 10, 20, 30, and 40).

In operation, streaming manager 110 is configured to: assign, responsive of a client agent 10 request for a specified file, a sub streams set, being a set of server agents configured each to partition the specified file into frames whose size is configured based on the specified file, wherein the sub streams set comprises a plurality of active server agents and further includes a plurality of redundant active server agents 20A-D selected based on network properties, such that a minimal number of excessive packets are sent to the client agent 10; and Streaming manager 110 is further configured manage the sub streams set asynchronously such that each server agent of 20A-D streams frames independently on other server agents in the sub streams set.

In addition, congestion reduction unit 120 is configured to employ a rate-based congestion control per sub streams set such that a bit rate associated with the sub streams set is maintained above a specified threshold.

FIG. 2 is a high level flowchart diagram illustrating a method according to some embodiments of the invention. It is understood that method 200 is not necessarily implemented by the aforementioned architecture of system 100. Method 200 includes the following stages: providing a Peer-to-Peer network including agents, each one of the agents being configurable as at least one of: a client agent configured to receive data and a server agent configured to stream data 210; assigning, responsive of a client agent request for a specified file, a sub streams set, being a set of server agents configured each to partition the specified file into frames whose size is configured based on the specified file, wherein the sub streams set comprises a plurality of active server agents and further includes a plurality of redundant active server agents selected based on network properties, such that a minimal number of excessive packets are sent to the client agent 220; managing the sub streams set asynchronously such that each server agent streams frames independently on other server agents in the sub streams set 230; and employing a rate-based congestion control per sub streams set such that a bit rate associated with the sub streams set is maintained above a specified threshold 240.

Consistent with one embodiment of the invention, streaming manager 110 is further configured to assign the sub streams set such that it further includes at least one of: a plurality of on-hold server agents and a plurality of inactive server agents.

Consistent with one embodiment of the invention, streaming manager 110 is further configured to exchange within the sub streams set, in response to the client agent 10 request, between any of: the active server agents 20, the on-hold server agents 30, and the inactive server agents 40, based on at least one of: momentary network properties, a status of the server agents, and a specified policy.

Consistent with one embodiment of the invention, the specified policy comprises preferring as active server agents at least one of: server agents that hold the requested file in their cache; server agents that are used below a specified frequency; server agents that are reliable above a specified threshold; server agents having a bandwidth above a specified level; and server agents not connected via a firewall.

Consistent with one embodiment of the invention, streaming manager 110 is further configured to calculate for the client agent, for each frame, its current receive rate and add or remove server agents from the active server agents accordingly.

Consistent with one embodiment of the invention, congestion reduction unit 120 is further configured to determine a congestion on an uplink channel of a server agent by examining packet loss reports from concurrent send sessions and lowers send rate responsive of lowering individual sessions or removing sessions entirely.

Consistent with one embodiment of the invention, congestion reduction unit 120 is further configured to determine a congestion on a downlink channel of a client agent by examining packet loss from concurrent receive sessions and sending a message to active server agents to increase their send interval by a specified factor.

On a practical implementation, two further aspects may be provided: (a) control packets are sent in batches with a approximately 10 ms delay between batches, wherein if no response is received after a specified timeout the control is sent again; and (b) agents holding the requested file in their cache are preferred over regular agents.

Following is a non-limiting message flow consistent with some embodiments of the present invention. It should be understood that other data flow schemes are also possible. A given client receives a download request from the browser and creates a file download session corresponding to this request. It immediately sends two messages in parallel: (a) a GetFileMap request to the central server; and (b) a Request-Cache message to its two super nodes.

The GetFileMap request returns with a list of nodes which were previously seeded with the requested file along with the file descriptor. The RequestCache request (if successful) returns with a list of agents holding the requested file in their cache (these agents are configured such they can actually send any slice they are requested.

On the client side, the client creates a stream monitor object that collects the results of the GetFileMap and RequestCache messages into possibly 3 lists:

(i) An active servers list—these are servers that are online (at least for the last approximately 3 minutes before the download request). The total available blocks per frame that this list support should be at least the minimum number of blocks needed for decoding a frame which is the file bit rate expressed in packets/sec. In the ideal case the total bandwidth supported by all active agents is about 30% more than the file bit rate. Servers on the active servers list are expected to actively participate in the streaming session.

(ii) On Hold servers list—once the list of active servers has been determined every extra server that has the minimum available bandwidth is put into the query servers list. Servers on this list are expected to be in standby mode. In this mode the route to the servers is opened at the beginning of the session (hole punching . . . ) and kept alive by the file client session. Queried servers may be asked to send a single frame as a quick assistance for decoding a particular frame or to become active servers and replace a server that has become offline or congested.

(iii) Inactive servers list—this list includes all the rest. These are backup servers that are first approached when the On Hold list size becomes less than required.

The streaming management unit creates the list after sorting the combined lists it gets from both requests according to the agent's score (the agent score is calculated by the central server and based roughly on its availability, reliability and geographical proximity). The highest score agents are inserted into the active list and in decreasing order the On Hold list and the inactive list.

Once the two lists have been prepared, the client sends a StartStream message to members of the active list in two rounds. Several messages (5) are sent simultaneously each time and am approximately 10 ms delay is used to prevent socket send errors. Once the active list has completed the clients sends each member of the Query list a StreamQuery message. This is also done in two rounds in a similar way to sending the StartStream messages.

For each of the agents in the active list and in the on hold list the client creates a sub stream object. The initial status of this object is pending. An active sub stream will change its status to active if a data packet has arrived. An on hold sub stream starts sending KeepAlive messages immediately after it is created. If a KeepAlive message is echoed back and received by this sub stream it changes its status from pending to on hold. Each control message has a timeout after which an action is taken. For StartStream and StreamQuery when the timeout expires and the status is still pending the messages are sent again.

Each data packet contains in its header, being for example, a 32 bit timestamp (in ms) of the time it was sent and a 32 bit sequence number. This data is used by the congestion control unit within the sub stream for calculating the packet loss and or "liveness" of the stream. Active sub streams send StreamAck messages every 1 second back to their server agent. Ack messages contain information needed for congestion control. This information may include, for example, packet loss, frame interval, current client frame, send interval and the like, on the server agent side.

On hold sub streams start sending KeepAlive messages every 3 seconds to their agents once they are created. These messages are echoed back to them. If no message is received after a 5.5 seconds the sub stream is stopped and the client looks for a replacement agent in the inactive list.

Referring now to the Server side an on hold agent receives a StreamQuery message and starts a new session corresponding to the session ID in the message header. It initially make sure that it has (or can generate, in case it has the whole file) the Slice requested. If it doesn't have it sends a stop message to the client and stops. Otherwise it starts echoing back KeepAlive messages. In case KeepAlive messages stop arriving and an exemplary 5.5 seconds timeout expired the agent sends a stop message to the client and stops, being a case of no connectivity.

An on hold agent can become active by receiving a StreamReplace message. If such a message is received the on hold agent changes its state and starts behaving like an active node. The StreamReplace message contains all the parameters needed for initializing an active agent.

An agent becomes active after either receiving a StreamStart message or a StreamReplace message. Both messages contain information needed for initializing a session (File hash, slice ID, start frame, stop frame, frame interval and the like). If the agent does not have the requested file it stops the session and sends a StreamStop message to the client. Otherwise it starts sending blocks from the requested file at the maximum possible interval (for example, frame interval/(BlocksPerSlicedFrame+1)).

An active agent contains a congestion control entity that monitors the performance of the agent and might change the block send interval.

The following is an exemplary flow control in accordance with the streaming protocol according to some embodiments of the invention. The client keeps a frame status table which is generated whenever the stream monitor is created. The Frame Status table contains the following information per frame:

(i) On Hold Bandwidth—the estimated cumulative bandwidth of all current on hold agents. This number is updated whenever an on hold agent stops or stops responding or when an active agent becomes on hold because there is more than enough bandwidth;

(ii) Pending On Hold Bandwidth—the cumulative bandwidth of all current pending on hold agents. Pending on hold bandwidth becomes on hold bandwidth whenever the first keep alive message is echoed back from the queried agent;

(iii) Expected blocks (Active Bandwidth)—the cumulative bandwidth of all current active agents. This number is updated whenever a sub stream moves to the next frame (I.e. the first packet of the next frame of this sub stream has arrived). In which case the sub stream bandwidth (in blocks) is subtracted from the expected blocks. The number is also updated whenever a active sub stream is added or subtracted (stops or becomes on hold);

(iv) Pending active bandwidth—the cumulative bandwidth of all pending active agents. A pending active agent becomes active (thereby moving its bandwidth to the active bandwidth) once the first data packet was received from the serving agent;

(v) Active agents—the number of current active agents. This number is updated whenever an agent stops or stops responding or whenever an agent becomes active (e.g through StreamRepace);

(vi) Missing Blocks—the number of missing blocks for decoding the frame. Initially this number is data frame size in blocks. This number is decreased by one whenever a block corresponding to the frame number arrives.

The stream monitor has several processes that monitor the progress of the session: Every 500 ms a process checks the difference between expected blocks and missing blocks for the current frame and the 3 frames ahead. If this difference is too small the stream monitor tries to add agents from the on hold list such that the total bandwidth for that frame is above the threshold. If an agent is added all subsequent frames starting from the frame that had the problem are updated by adding the agents' bandwidth.

Every 4 seconds the overall progress is monitored. The Stream monitor compares the last decoded frame to the current frame.

Stopped sub streams, i.e sub streams that stopped because the user turned off his/her computer or became congested or don't have proper NAT connectivity are removed from the status table and then returned to the inactive list. Inactive servers serve as backup to the on hold list and may be tried several times before they are declared completely useless.

The following is an exemplary congestion control scheme consistent with the streaming protocol in accordance with some embodiments of the invention. Apparently, a point to point congestion control for a multi source stream is impractical because the aggregate control bandwidth needed will in most cases exceed the user upload limit. A different method is needed which requires less controls. The approach taken is the following:

A simple point to point congestion control strategy is implemented for each sub stream. The serving sub stream receives packet loss reports from the client every send interval (starting at 1000 ms). If the packet loss is too high it reduces the number of packets it sends by 1, this may be repeated until a minimum of 1 packet per second is sent. If the packet loss is 0 for at least 2 seconds the number of packets of sent per interval is increased by 1 until a maximum of required packets per interval is reached. This kind of congestion control is intended to deal with random congestion somewhere on the link connecting the client and serving sub stream.

Congestion that occurs on the server side is detected when several concurrent serving session receive reports of high packet loss at the same time. This could happen for example when a new serving session is added to the existing ones and causes the agent to exceed the user upload capacity. In this case the bandwidth manager will stop the last serving session.

On the client side congestion control is done on the sub stream level. The client adds or subtracts sub streams according to the status in the frame status table. In addition the client detects congestion on its side when packet loss occurs for several sub streams at the same time. Such correlated packet loss is an indication for client side congestion. The client reacts by sending all active sub streams a StreamReplace message telling them to increase their send interval by a factor of 2. Once the total packet loss has been reduced to less than a minimum threshold the client signals the serving nodes to decrease the send interval by an additive quantity (e.g. 200 ms) through the StreamAck message. Because StreamAck messages are sent every send interval the amount of upload bandwidth they consume even for hundreds of sub streams is small.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in base band or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram portion or portions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions.

The aforementioned flowchart and diagrams illustrate the architecture, functionality, and operation of possible implementations of systems, methods and computer program products according to various embodiments of the present invention. In this regard, each portion in the flowchart or portion diagrams may represent a module, segment, or portion of code, which comprises one or more executable instructions for implementing the specified logical function(s). It should also be noted that, in some alternative implementations, the functions noted in the portion may occur out of the order noted in the figures. For example, two portions shown in succession may, in fact, be executed substantially concurrently, or the portions may sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention.

What is claimed is:

1. A method of data streaming over a Peer-to-Peer network including agents, each one of the agents being configurable as at least one of: a client agent to receive data and a server agent to stream data, the method comprising:

assigning, responsive of a client agent request for a specified file, a set of sub streams, wherein the set of sub-streams comprises a plurality of server agents, wherein each one of the plurality of server agents is to partition the specified file into frames whose size is configured based on the specified file, wherein the sub streams set comprises a plurality of active server agents and a plurality of on-hold server agents, wherein the plurality of active server agents and the plurality of on-hold server agents are adapted to minimize a number of excessive packets sent to the client agent;

managing the set of sub streams asynchronously such that each one of the plurality of server agent is adapted to stream frames independently of other server agents comprising the set of sub streams;

employing a rate-based congestion control for each stream in the set of sub streams, further comprising:

determining congestion on an uplink channel for at least one of the plurality of server agents by examining packet loss data reports from concurrent send sessions to determine whether to lower send rates of data packets sent from at least one of the plurality server agents and/or remove a serving session associated with at least one of the plurality of server agents, determining congestion on a downlink channel of the client agent by examining packet loss of more than one substream in the set of substreams to determine whether to increase a send interval existing between data packets sent from each of the plurality of server agents; and wherein the rate-based congestion control is adapted to maintain a bit rate, associated with the set of sub streams, above a specified threshold.

2. The method according to claim 1, wherein in the assigning, the set of sub streams further comprises at least one of: a plurality of on-hold server agents and a plurality of inactive server agents.

3. The method according to claim 2, further comprising exchanging within the set of sub streams, in response to a decision made by the client agent, between any of: the active server agents, the on-hold server agents, and the inactive server agents, based on at least one of: momentary network properties, a status of the server agents, and a specified policy.

4. The method according to claim 3, wherein the specified policy comprises preferring as active server agents at least one of: server agents that hold the requested file in their cache; server agents that are used below a specified frequency; server agents that are reliable above a specified threshold; server agents having a bandwidth above a specified level; server agents associated with a specified type of connection; and server agents not connected via a firewall.

5. The method according to claim 1, further comprising calculating for the client agent, for each frame, its current receive rate and adding or removing server agents from the active server agents accordingly.

6. A system for data streaming over a Peer-to-Peer network, comprising:
a Peer-to-Peer network that includes agents, each one of the agents being configurable as at least one of: a client agent to receive data and a server agent to stream data;
a streaming manager to:
(i) assign, responsive of a client agent request for a specified file, a set of sub streams, wherein the set of substreams comprises a plurality of server agents, wherein each one of the server agents is configured to partition the specified file into frames whose size is configured based on the specified file, wherein the set of sub streams comprises a plurality of active server agents and a plurality of on-hold server agents, wherein the plurality of active server agents and the plurality of on-hold server agents are adapted to minimize a number of excessive packets sent to the client agent; and
(ii) manage the set for sub streams such that each one of the server agents is adapted to stream frames independently of other server agents in the set of sub streams;
a congestion reduction unit configured to employ a rate-based congestion control for each set of sub streams further comprising:
a unit adapted for determining congestion on an uplink channel for at least one of the plurality of server agents by examining packet loss data reports from concurrent send sessions to determine whether to lower send rates of data packets sent from the at least one of the plurality server agents and/or remove a serving session associated with the at least one of the plurality of server agents,
a unit adapted for determining congestion on a downlink channel of the client agent by examining packet loss of more than one substream in the set of substreams to determine whether to increase a send interval existing between data packets sent from each of the plurality of server agents; and wherein the congestion reduction unit is adapted to maintain a bit rate, associated with the set of sub streams, above a specified threshold.

7. The system according to claim 6, wherein the streaming manager is further configured to assign the set of sub streams such that it further includes at least one of: a plurality of on-hold server agents and a plurality of inactive server agents.

8. The system according to claim 7, wherein the streaming manager is further configured to exchange within the sub streams set, in response to a decision made by the client agent, between any of: the active server agents, the on-hold server agents, and the inactive server agents, based on at least one of: momentary network properties, a status of the server agents, and a specified policy.

9. The system according to claim 8, wherein the specified policy comprises preferring as active server agents at least one of: server agents that hold the requested file in their cache; server agents that are used below a specified frequency;
server agents that are reliable above a specified threshold; server agents having a bandwidth above a specified level; server agents associated with a specified connection; and server agents not connected via a firewall.

10. The system according to claim 6, wherein the streaming manager is further configured to calculate for the client agent, for each frame, its current receive rate and add or remove server agents from the active server agents accordingly.

11. A computer program product, the computer program product comprising:
a non-transitory computer readable storage medium having computer readable program embodied therewith, in operative association with a Peer-to-Peer network that includes agents, each one of the agents being configurable as at least one of: a client agent to receive data and a server agent to stream data, the computer readable program comprising:
computer readable program code to assign, responsive of a client agent request for a specified file, a set of sub streams, wherein the set of substreams, comprises being a plurality set of server agents, wherein each one of the server agents is configured to partition the specified file into frames whose size is configured based on the specified file, wherein the sub streams set comprises a plurality of active server agents and a plurality of on-hold server agents, wherein the plurality of active server agents and the plurality of on-hold server agents are adapted to minimize a number of excessive packets sent to the client agent;
computer readable program code to manage the set of sub streams such that each one of the server comprising the set of substreams is adapted to frames independently of other server agents in the set of sub streams;
computer readable program code to employ a rate-based congestion control for each stream in the set of sub-streams, further comprising:
computer readable program code for determining congestion on an uplink channel for at least one of the plurality of server agents by examining packet loss data reports from current send sessions to determine whether to lower send rates of data packets sent from the at least one of the plurality server agents and/or remove a serving session associated with the at least one of the plurality of server agents,
computer readable program code for determining congestion on a downlink channel of the client agent by examining packet loss of more than one substream in the set of substreams to determine whether to increase a send interval existing between data packets sent from each of the plurality of server agents; and wherein the rate-based congestion control is adapted to maintain a bit rate, associated with the set of sub streams, above a specified threshold.

12. The computer program product according to claim 11, further comprising computer readable program code to assign the sub streams set such that it further includes at least one of: a plurality of on-hold server agents and a plurality of inactive server agents.

13. The computer program product according to claim 11, further comprising computer readable program code to exchange within the sub streams set, in response to a decision made by the client agent, between any of: the active server agents, the on-hold server agents, and the inactive server agents, based on at least one of: momentary network properties, a status of the server agents, and a specified policy.

14. The computer program product according to claim 11, wherein the specified policy comprises preferring as active server agents at least one of: server agents that hold the requested file in their cache; server agents that are used below a specified frequency; server agents that are reliable above a specified threshold; server agents having a bandwidth above a specified level; server agents associated with a specified connection, and server agents not connected via a firewall.

15. The computer program product according to claim 11, further comprising computer readable program code to calculate for the client agent, for each frame, its current receive rate and add or remove server agents from the active server agents accordingly.

* * * * *